US011451677B2

(12) United States Patent
Noguchi et al.

(10) Patent No.: US 11,451,677 B2
(45) Date of Patent: Sep. 20, 2022

(54) CONTROL DEVICE AND NON-TRANSITORY COMPUTER READABLE MEDIUM STORING CONTROL PROGRAM

(71) Applicant: FUJIFILM Business Innovation Corp., Tokyo (JP)

(72) Inventors: Nozomi Noguchi, Kanagawa (JP); Hideaki Sugimoto, Kanagawa (JP); Yu Mishima, Kanagawa (JP); Shigeo Miyata, Kanagawa (JP); Hiroyuki Mitsuhashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 51 days.

(21) Appl. No.: 16/574,042

(22) Filed: Sep. 17, 2019

(65) Prior Publication Data
US 2020/0099800 A1 Mar. 26, 2020

(30) Foreign Application Priority Data
Sep. 25, 2018 (JP) .............................. JP2018-178440

(51) Int. Cl.
| | | |
|---|---|---|
| H04N 1/00 | (2006.01) | |
| H04N 1/04 | (2006.01) | |
| H04L 12/18 | (2006.01) | |
| H04L 51/02 | (2022.01) | |

(52) U.S. Cl.
CPC ..... *H04N 1/00408* (2013.01); *H04L 12/1895* (2013.01); *H04L 51/02* (2013.01); *H04N 1/00204* (2013.01); *H04N 1/00477* (2013.01); *H04N 1/04* (2013.01)

(58) Field of Classification Search
CPC ..... H04L 51/02; H04L 51/18; H04L 12/1895; H04L 51/046; H04L 51/16; H04L 51/20; H04L 51/24; H04N 1/00204; H04N 1/00408; H04N 1/00477; H04N 1/04; H04N 1/3263; H04N 1/32635; H04N 1/32662
USPC ......................................... 358/1.15
See application file for complete search history.

(56) References Cited

U.S. PATENT DOCUMENTS

| | | |
|---|---|---|
| 8,090,776 B2 | 1/2012 | Torres et al. |
| 9,325,651 B2 | 4/2016 | Sakuta et al. |
| 10,165,017 B2 | 12/2018 | Lin et al. |
| 10,943,319 B2 * | 3/2021 | Kawasaki .............. G06Q 90/00 |

(Continued)

FOREIGN PATENT DOCUMENTS

| | | |
|---|---|---|
| CN | 1783792 | 6/2006 |
| CN | 10128314 | 10/2008 |

(Continued)

OTHER PUBLICATIONS

"Office Action of China Counterpart Application", dated Jun. 15, 2022, with English translation thereof, p. 1-p. 17.

(Continued)

*Primary Examiner* — Negussie Worku
(74) *Attorney, Agent, or Firm* — JCIPRNET

(57) ABSTRACT

A control device includes an execution control unit that performs control to execute specific processing based on information posted by a user in a talk room in which each of plural participating users is able to post and view information, in which the execution control unit provides notification regarding execution of the specific processing to only some of the plural users according to predetermined conditions.

20 Claims, 11 Drawing Sheets

(56) References Cited

U.S. PATENT DOCUMENTS

| | | | |
|---|---|---|---|
| 11,012,379 B2* | 5/2021 | Maruyama | H04L 51/02 |
| 11,019,113 B2* | 5/2021 | Kurata | H04L 65/1069 |
| 11,025,680 B2 | 6/2021 | Lin et al. | |
| 11,108,711 B2* | 8/2021 | Matsumoto | H04L 51/02 |
| 2014/0032684 A1* | 1/2014 | Chung | H04L 51/04 |
| | | | 709/206 |
| 2014/0244769 A1* | 8/2014 | Sakuta | H04L 51/18 |
| | | | 709/206 |
| 2016/0021038 A1 | 1/2016 | Woo et al. | |
| 2016/0371791 A1 | 12/2016 | Lee | |
| 2018/0167451 A1* | 6/2018 | Yi | H04L 65/1069 |
| 2020/0097863 A1* | 3/2020 | Hiruta | G06Q 10/0631 |
| 2020/0204511 A1* | 6/2020 | Choi | H04L 51/16 |
| 2020/0304439 A1* | 9/2020 | Matsumoto | H04L 51/04 |
| 2021/0168261 A1* | 6/2021 | Nakamura | H04N 1/00403 |

FOREIGN PATENT DOCUMENTS

| | | |
|---|---|---|
| CN | 104009908 | 8/2014 |
| CN | 105659521 | 6/2016 |
| CN | 106576070 | 4/2017 |
| CN | 107342929 | 11/2017 |
| CN | 107730082 | 2/2018 |
| CN | 108449194 | 8/2018 |
| EP | 2456145 | 5/2012 |
| JP | 2014164522 | 9/2014 |
| JP | 2020029077 | 2/2020 |
| TW | 200924459 | 6/2009 |

OTHER PUBLICATIONS

Wang Tao, "The Design and Implementation of an IM-based Intelligent Service Robot Platform," Master's thesis, Mar. 2012, Department of Software Engineering, Huazhong University of Science & Technology.

Yu Zhang et al., "Design of Personal Assistant Robot with Interactive Interface of Learning and Working," 2014 Fifth International Conference on Intelligent Systems, Modelling and Simulation, Oct. 2015, pp. 502-506.

"Office Action of Japan Counterpart Application", dated Jul. 26, 2022, with English translation thereof, p. 1-p. 6.

* cited by examiner

FIG. 4
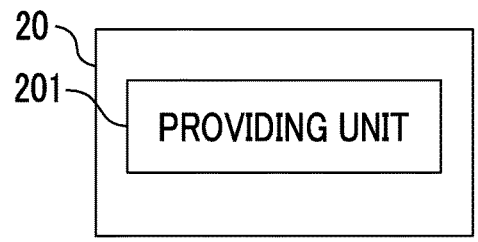
FIG. 5
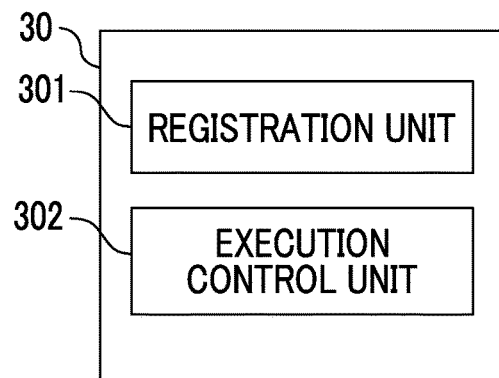
FIG. 6
| USER | IMAGE FORMING APPARATUS | PERSONAL PRINT SETTINGS |
|---|---|---|
| A | IMAGE FORMING APPARATUS 40A | DOUBLE-SIDED, COLOR, ⋯ |
| B | IMAGE FORMING APPARATUS 40B | SINGLE-SIDED, COLOR, ⋯ |
| ⋮ | ⋮ | ⋮ |

FIG.7

| TALK ROOM | IMAGE FORMING APPARATUS | PARTICIPATING USER | PRINT SETTINGS FOR TALK ROOM |
|---|---|---|---|
| X | IMAGE FORMING APPARATUS 40A | USER A | DOUBLE-SIDED, COLOR, ... |
| | | USER B | SINGLE-SIDED, MONOCHROME, ... |
| | | USER C | DOUBLE-SIDED, MONOCHROME, ... |
| | | USER D | SINGLE-SIDED, MONOCHROME, ... |
| Y | IMAGE FORMING APPARATUS 40A | USER A | DOUBLE-SIDED, COLOR, ... |
| | | USER B | SINGLE-SIDED, MONOCHROME, ... |
| | | USER C | DOUBLE-SIDED, COLOR, ... |
| | | USER D | SINGLE-SIDED, MONOCHROME, ... |
| ... | ... | ... | ... |

CONTROL DEVICE AND NON-TRANSITORY COMPUTER READABLE MEDIUM STORING CONTROL PROGRAM

CROSS-REFERENCE TO RELATED APPLICATIONS

This application is based on and claims priority under 35 USC 119 from Japanese Patent Application No. 2018-178440 filed Sep. 25, 2018.

BACKGROUND

(i) Technical Field

The present invention relates to a control device and a non-transitory computer readable medium storing a control program.

(ii) Related Art

JP2014-164522A discloses a message notification apparatus including: operation instruction detection means for detecting an operation instruction for operating an external apparatus from a message in a communication service for displaying a message written by a member in time series and specifying the member who has written the message as an instructor of the operation instruction; external apparatus control means for controlling the external apparatus according to the operation instruction detected by the operation instruction detection means; operation result acquisition means for acquiring an operation result of the external apparatus under the control of the external apparatus control means; report message generation means for generating a report message for reporting the operation result acquired by the operation result acquisition means; and report message display means for outputting the report message generated by the report message generation means to a server, which provides the communication service, and displaying the message in the communication service in a state in which the instructor specified by the operation instruction detection means is specified as a destination.

SUMMARY

In recent years, a chatbot, which is an automatic conversation program, is known. The chatbot posts a message automatically in response to posting of a user's message in a talk room. As another application example, the chatbot executes processing required for execution of an instruction included in a message posted by the user. For example, in a case where the user posts a message regarding an instruction to make an information processing apparatus execute specific processing, the chatbot causes the information processing apparatus to execute the specific processing.

In the technique described above, a situation in which a plurality of users participate in a talk room is not assumed. In the talk room in which a plurality of users participate, in a case where an instruction to execute specific processing is given to the chatbot as in a talk room in which there is only one user, all notifications regarding the execution of the specific processing are posted to the talk room. However, some of the users participating in the talk room may be less associated with information notified from the chatbot. Such users may feel that the notification of the information from the chatbot is troublesome.

Aspects of non-limiting embodiments of the present disclosure relate to a control device and a non-transitory computer readable medium storing a control program capable of reducing troublesomeness of notification for a user less associated with information, which is relevant to execution of specific processing, compared with a case in which a chatbot, which controls the execution of the specific processing based on an instruction received from a user in a talk room in which a plurality of users participate, provides notification of all pieces of the information associated with the execution of the specific processing in the talk room.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control device including an execution control unit that performs control to execute specific processing based on information posted by a user in a talk room in which each of a plurality of participating users is able to post and view information, in which the execution control unit provides notification regarding execution of the specific processing to only some of the plurality of users according to predetermined conditions.

BRIEF DESCRIPTION OF THE DRAWINGS

Exemplary embodiment(s) of the present invention will be described in detail based on the following figures, wherein:

FIG. 4 is a block diagram showing an example of the functional configuration of the talk room server;

FIG. 5 is a block diagram showing an example of the functional configuration of the chatbot server;

FIG. 6 shows an example of a table that is registered in a registration unit to show a correspondence relationship between a user and an image forming apparatus;

FIG. 7 shows an example of a table that is registered in a registration unit to show a correspondence relationship between a talk room and an image forming apparatus;

DETAILED DESCRIPTION

Figure 1:
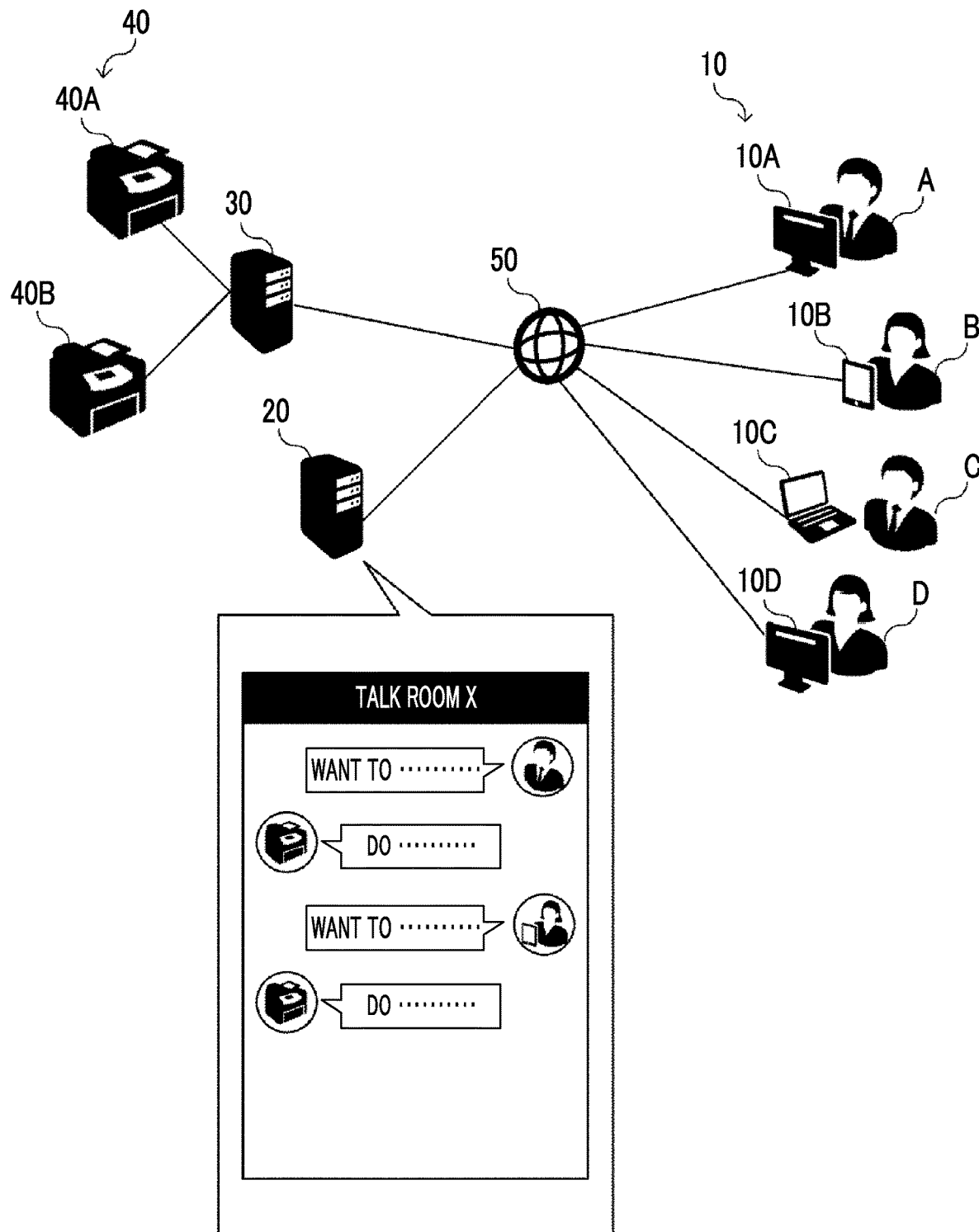
FIG. 1 is a diagram showing the schematic configuration of a control system according to an exemplary embodiment of the present invention.

Hereinafter, examples of exemplary embodiments of the present invention will be described with reference to the accompanying drawings. In the drawings, the same or equivalent constituent elements and portions are denoted by the same reference numerals. In addition, the dimensional ratios of the drawings are exaggerated for convenience of explanation and may be different from the actual ratios.

First Exemplary Embodiment

FIG. 1 is a diagram showing the schematic configuration of a control system according to an exemplary embodiment of the present invention.

The control system includes a user terminal 10, a talk room server 20, a chatbot server 30, and an information processing apparatus 40. The user terminal 10, the talk room server 20, and the chatbot server 30 (control device) are connected to each other through the Internet 50.

The user terminal 10 is a terminal used by a user, and may be any terminal, such as a desktop computer, a notebook computer, a tablet, and a smartphone. In FIG. 1, it is assumed that a user A uses a user terminal 10A, a user B uses a user terminal 10B, a user C uses a user terminal 10C, and a user D uses a user terminal 10D. The user terminals 10A to 10D are collectively referred to as the user terminal 10.

The talk room server 20 provides a talk room. The talk room is a virtual space in which both a user and a chatbot, which will be described later, participate so that information, such as messages, symbol strings, images, stamps, and buttons, can be posted and shared as chat. Here, the chat is to make a conversation by a plurality of members inputting information in real time on a computer network. Here, the member includes both a user associated with a real person and a software robot that operates according to specific rules. The chatbot is a software robot that performs control to execute specific processing based on information posted by a user on a talk room.

In the talk room, the user can post information or speak through the user terminal 10. In the talk room, users can share information, and the chatbot can reply in response to information posted by the user. In addition, in the talk room, the user can give an instruction, which is for causing the information processing apparatus 40 to execute specific processing, to the chatbot. For example, the chatbot extracts an instruction to execute specific processing from information, such as a posted message, by natural language processing and controls the information processing apparatus 40 to execute the specific processing. In addition, a user and a chatbot can participate in a talk room on a one-to-one basis (user is only one person), or a plurality of users and a chatbot can participate in a talk room. Hereinafter, the talk room in which a user and a chatbot participate on a one-to-one basis is referred to as a private talk room, and the talk room in which a plurality of users and a chatbot participate is referred to as a group talk room. There can be a plurality of talk rooms as many as opened talk rooms.

The chatbot server 30 is a server that manages the chatbot. As described above, the chatbot participates in the talk room and responds to a user's message or causes the information processing apparatus 40 to execute specific processing according to an instruction included in the message.

In a case where information regarding an instruction to cause the information processing apparatus 40 to execute specific processing is posted in the talk room in which the chatbot participates, the chatbot controls the information processing apparatus 40 registered in association with the user participating in the talk room to execute the specific processing. The information processing apparatus 40 may be an apparatus that performs any kind of information processing. Here, examples of the information processing include processing for executing printing from text data, image data, and the like, processing for generating or processing data using materials provided in the information processing apparatus 40, and processing for transmission and reception of data between the information processing apparatus 40 and other apparatuses. Hereinafter, a case where the information processing apparatus 40 is an image forming apparatus and the instruction to execute specific processing is an instruction to execute printing will be described as an example. Hereinafter, the image forming apparatus will also be described with reference numeral 40. Instructions to execute printing include not only a direct printing instruction with respect to the image forming apparatus 40 but also an instruction to provide information required for generating a print job, for example, image data to be printed or specifications of printing in the talk room.

The image forming apparatus 40 is an apparatus that forms an image on a recording medium, such as paper, based on a print job, and may be any apparatus, such as a printer or a complex machine. In the example of the control system shown in FIG. 1, an image forming apparatus 40A and an image forming apparatus 40B are connected to the chatbot server 30. The image forming apparatus 40A and the image forming apparatus 40B are collectively referred to as an "image forming apparatus 40". In the example shown in FIG. 1, the image forming apparatus 40 is connected to the chatbot server 30. However, the image forming apparatus 40 may be connected to the chatbot server 30 through the Internet 50.

Next, the hardware configuration of the talk room server 20 and the chatbot server 30 will be described.

Figure 2:
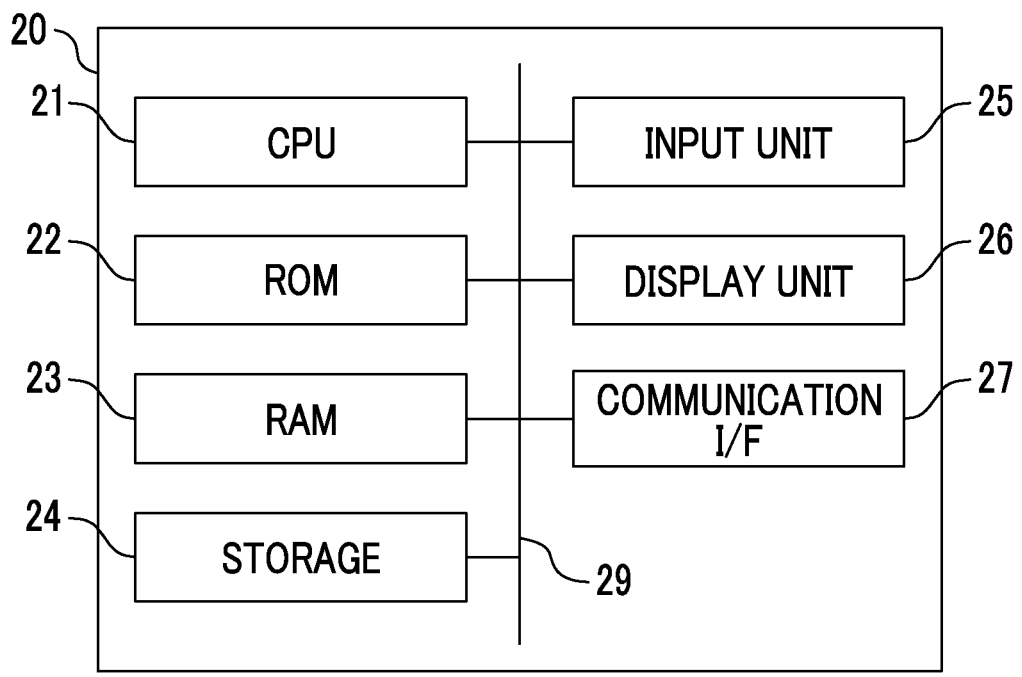
FIG. 2 is a block diagram showing the hardware configuration of a talk room server.

FIG. 2 is a block diagram showing the hardware configuration of a talk room server.

As shown in FIG. 2, the talk room server 20 has components of a central processing unit (CPU) 21, a read only memory (ROM) 22, a random access memory (RAM) 23, a storage 24, an input unit 25, a display unit 26, and a communication interface 27. The respective components are communicably connected to each other through a bus 29.

The CPU 21 is a central processing unit, and executes various programs or controls each unit. That is, CPU 21 reads a program from the ROM 22 or the storage 24, and executes the program with the RAM 23 as a work area. The CPU 21 performs control and various kinds of arithmetic processing of the above-described components according to the program recorded in the ROM 22 or the storage 24. In the present exemplary embodiment, a talk room providing program for providing a talk room is stored in the ROM 22 or the storage 24.

The ROM 22 stores various programs and various kinds of data. The RAM 23 temporarily stores a program or data as a work area. The storage 24 is a hard disk drive (HDD) or a solid state drive (SSD), and stores various programs including an operating system and various kinds of data.

The input unit 25 includes a pointing device, such as a mouse, and a keyboard, and is used to perform various kinds of input. The display unit 26 is, for example, a liquid crystal display, and displays various kinds of information. A touch panel type display unit 26 may be used, so that the display unit 26 functions as the input unit 25. The communication interface 27 is an interface for communicating with other apparatuses through the Internet 50. For example, standards, such as Ethernet (registered trademark), FDDI, and Wi-Fi (registered trademark), are used.

Figure 3:
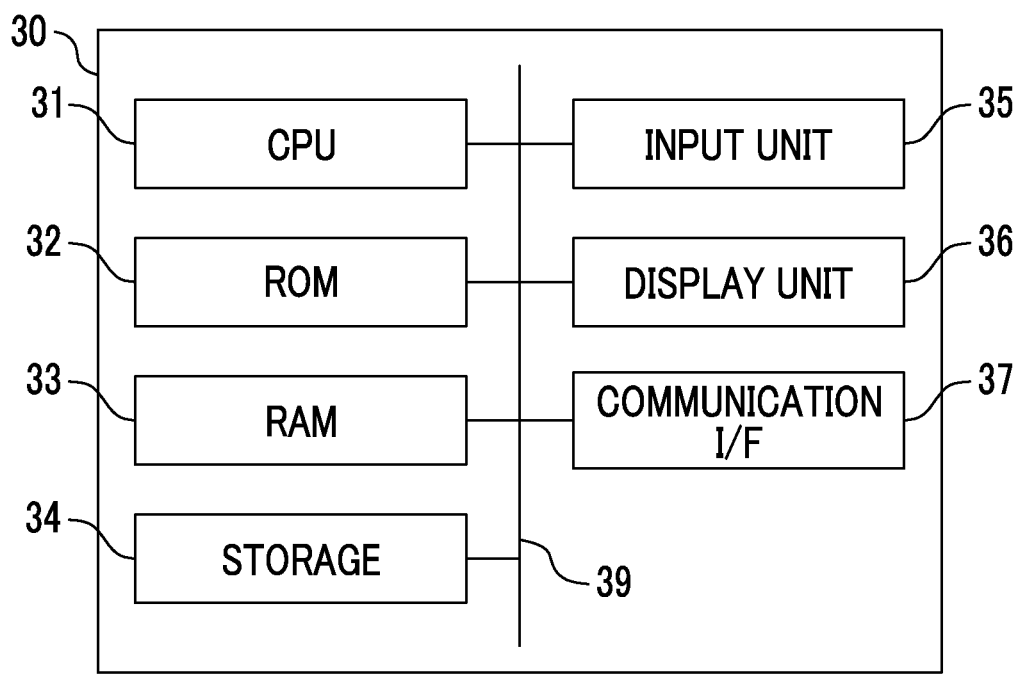
FIG. 3 is a block diagram showing the hardware configuration of a chatbot server.

FIG. 3 is a block diagram showing the hardware configuration of a chatbot server.

As shown in FIG. 3, the chatbot server 30 has components of a CPU 31, a ROM 32, a RAM 33, a storage 34, an input unit 35, a display unit 36, and a communication interface 37. The respective components are communicably connected to each other through a bus 39. Each component of the chatbot server 30 has the same function as each component of the talk room server 20 in FIG. 2.

Next, the functional configuration of the talk room server 20 and the chatbot server 30 will be described.

FIG. 4 is a block diagram showing an example of the functional configuration of a talk room server.

As shown in FIG. 4, the talk room server 20 has a providing unit 201 as a functional configuration. The functional configuration is realized by the CPU 21 that reads a talk room providing program stored in the ROM 22 or the storage 24 and loads the talk room providing program to the RAM 23 to execute the talk room providing program.

The providing unit 201 provides a talk room in which a plurality of users participate and information, such as messages, can be posted. The talk room server 20 provides a talk room in which a user and a chatbot participate on a one-to-one basis, a talk room in which a plurality of users and a chatbot participate, and the like. A plurality of talk rooms can be opened according to the opening request from the user. For example, in a case where a certain user accesses the talk room server 20 to make a talk room opening request and opens a specific talk room, the user who is a creator can invite another user to the opened talk room so that the user participates in the opened talk room. Alternatively, a user participating in the talk room can invite another user not participating in the talk room to the talk room so that the user newly participates in the talk room.

FIG. 5 is a block diagram showing an example of the functional configuration of a chatbot server. FIG. 6 shows an example of a table that is registered in a registration unit to show a correspondence relationship between a user and an image forming apparatus. FIG. 7 shows an example of a table that is registered in a registration unit to show a correspondence relationship between a talk room and an image forming apparatus.

As shown in FIG. 5, the chatbot server 30 has a registration unit 301 and an execution control unit 302 as a functional configuration. The functional configuration is realized by the CPU 31 that reads a control program stored in the ROM 32 or the storage 34 and loads the control program to the RAM 33 to execute the control program.

For example, as shown in FIG. 6, the registration unit 301 registers a user and an image forming apparatus in association with each other. In the example shown in FIG. 6, basic print settings at the time of giving a print instruction are further associated with each user. In addition, for example, as shown in FIG. 7, the registration unit 301 registers a talk room and an image forming apparatus in association with each other. In the example shown in FIG. 7, a user and basic print settings for each user are further associated with each talk room.

The correspondence table shown in FIG. 6 is provided in order to register settings in a case where a user and a chatbot participate in a talk room on a one-to-one basis, that is, settings in a case where a user gives an instruction to an image forming apparatus mostly used by the user. On the other hand, the correspondence table shown in FIG. 7 is provided in order to register settings in a case where a plurality of users participate in a talk room, that is, settings in a case where a talk room is shared. In the correspondence table shown in FIG. 7, a user participating in a talk room is associated with each talk room, and print settings in the talk room are associated with each user. In a talk room, the image forming apparatus 40 for executing processing based on an instruction in the talk room is registered so as to be associated with the talk room. A plurality of image forming apparatus 40 may be associated with a talk room.

The execution control unit 302 participates in a talk room as a chatbot. Then, in a case where information regarding an instruction to cause the image forming apparatus (information processing apparatus) 40 to execute printing is posted by the user in the talk room, the execution control unit 302 controls the image forming apparatus 40 associated with the talk room to execute printing. The image forming apparatus 40 may have a scanner function. In a case where information regarding an instruction to cause the image forming apparatus 40 to execute a scan is posted by the user in the talk room, the execution control unit 302 controls the image forming apparatus 40 to execute a scan.

In addition, the execution control unit 302 provides notification regarding the execution of printing instruction (specific processing) to some of a plurality of users participating in the talk room according to predetermined conditions. The predetermined conditions, selection of a user to whom notification is to be provided, and the like will be described later.

Next, the operation of the chatbot server 30 will be described.

Figure 8:
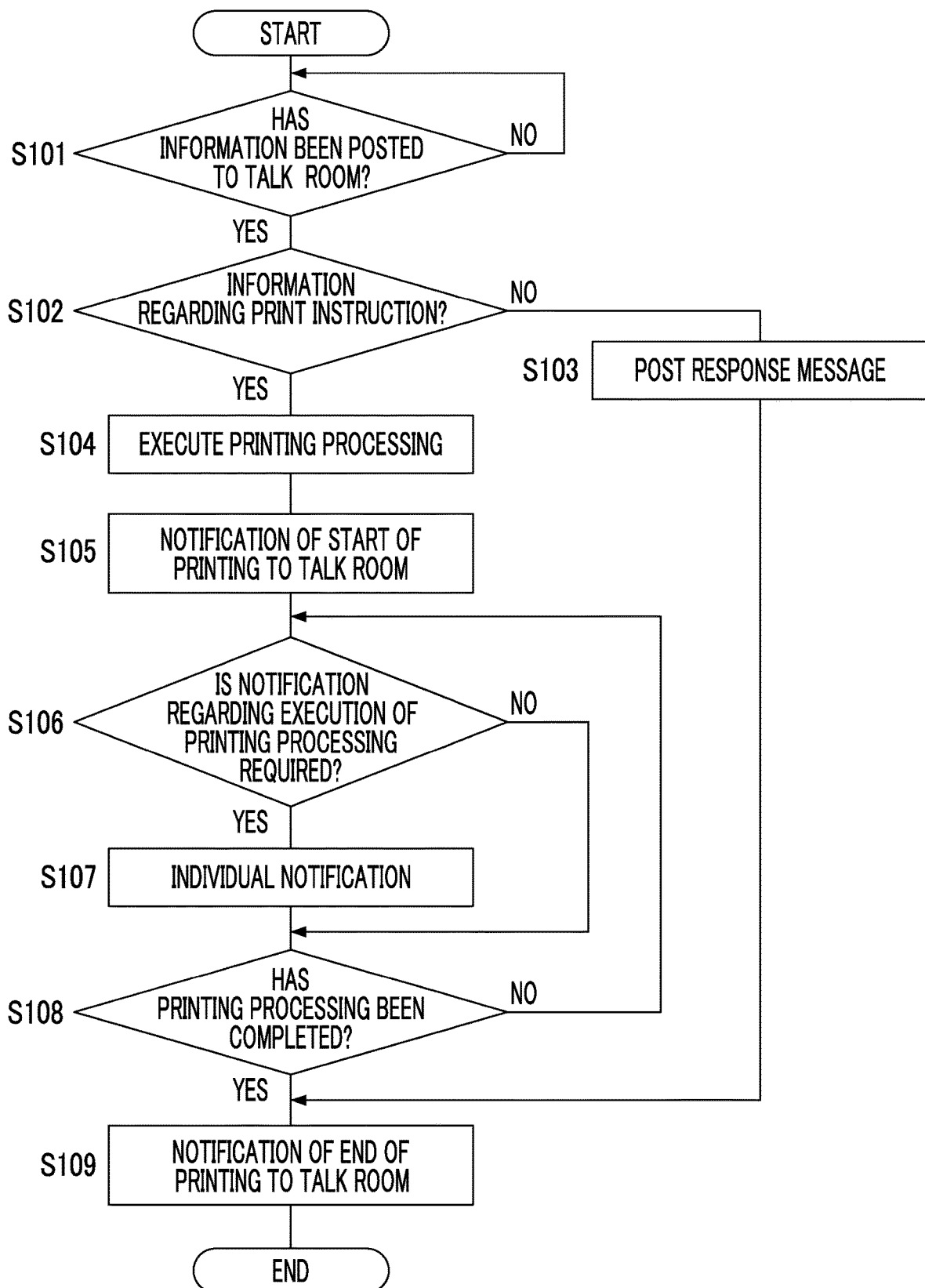
FIG. 8 is a flowchart showing the flow of control processing by a chatbot server.
Figure 9:
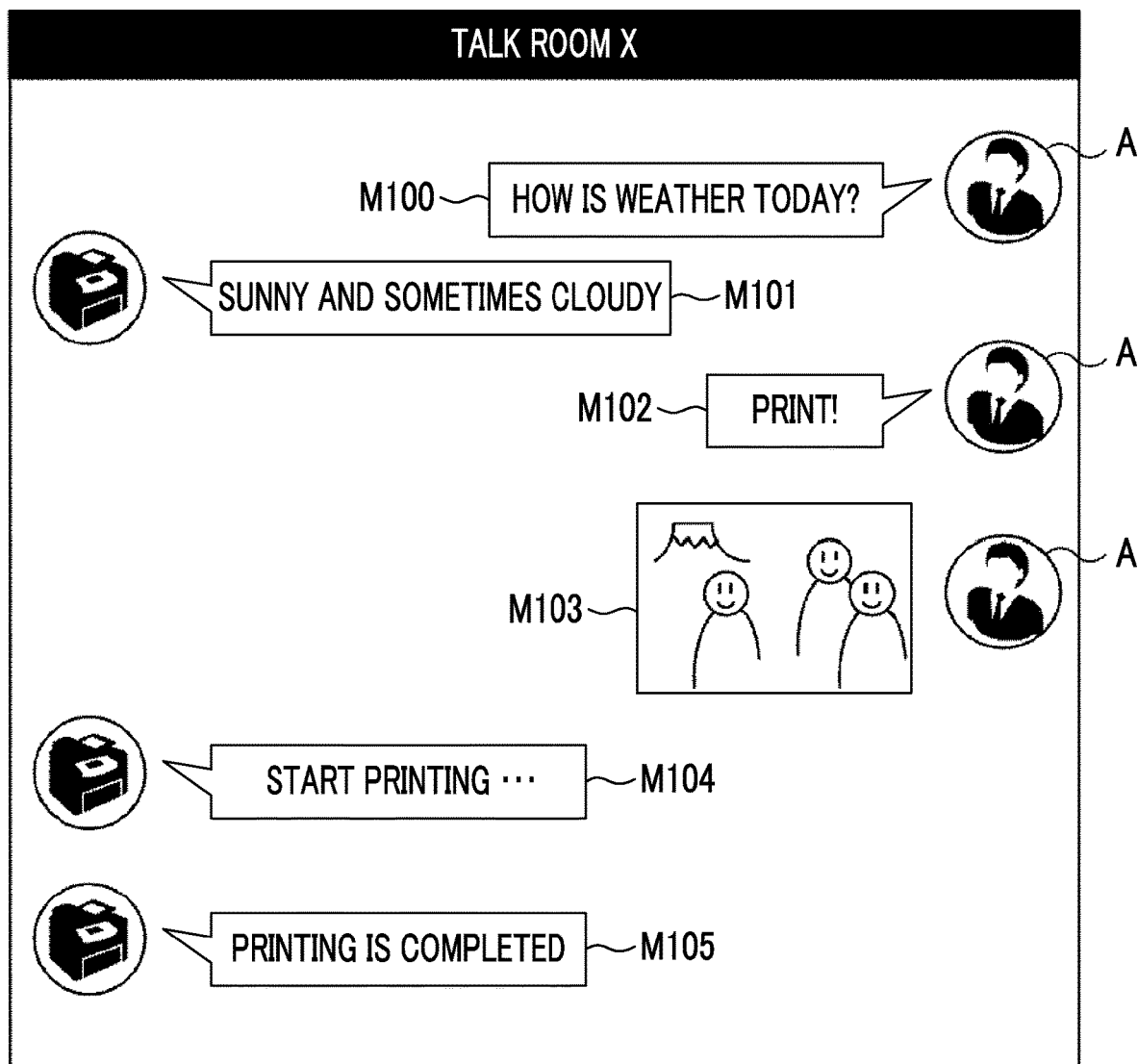
FIG. 9 is a diagram showing how posting is executed in a talk room.
Figure 10:
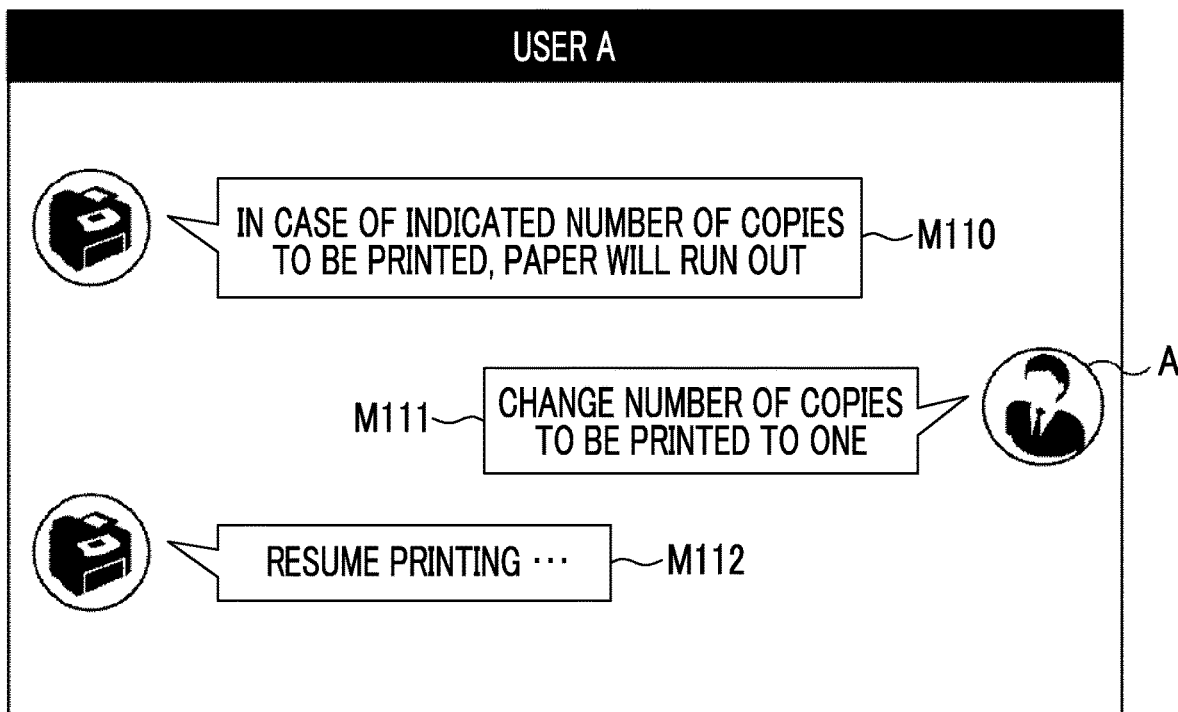
FIG. 10 is a diagram showing how posting is executed in a talk room.

FIG. 8 is a flowchart showing the flow of control processing by a chatbot server. The control processing is performed by the CPU 31 that reads a control program from the ROM 32 or the storage 34 and loads the control program to the RAM 33 to execute the control program. FIGS. 9 and 10 are diagrams showing how posting is executed in a talk room.

As the execution control unit 302, the CPU 31 determines whether or not information has been posted to the talk room by the user (step S101). In a case where no information is posted to the talk room (step S101: NO), the CPU 31 waits until there is posting. In a case where information is posted to the talk room (step S101: YES), the CPU 31 determines whether or not the posted information is information regarding a print instruction (step S102). Here, the CPU 31 executes natural sentence analysis of a message included in the posted information, and determines the posted information to be information regarding a print instruction in a case where "print" or a term relevant to the print settings is included.

In a case where the posted information is not relevant to the print instruction (step S102: NO), the CPU 31 posts information, such as a response message matching the posted information, to the talk room (step S103). For example, as shown in FIG. 9, in a case where information M100 for inquiring about the weather is posted, the CPU 31 serving as a chatbot acquires weather information from the Internet and posts information M101 for responding to the weather inquiry to the talk room. In this manner, a conversation between the user and the chatbot is made in the talk room.

In a case where the posted information is relevant to the print instruction (step S102: YES), the CPU 31 serving as the execution control unit 302 controls the image forming apparatus 40 to execute printing processing (step S104). In the talk room, for example, as shown in FIG. 9, in a case where the instruction information M102 and M103 is posted as information relevant to the print instruction, the CPU 31 causes the image forming apparatus 40 to execute printing processing.

The CPU 31 notifies that printing is to be started in the talk room (step S105). In the talk room, for example, as shown in FIG. 9, the CPU 31 posts information M104 indicating that printing is to be started.

The CPU 31 determines whether or not notification regarding the execution of printing processing is required (step S106). The notification regarding the execution of printing processing is, for example, a notification regarding an error occurring until the printing processing is completed. The error is, for example, paper out or paper jam. The case where such an error occurs is a case where notification regarding the execution of printing processing is required. The notification regarding the execution of printing processing does not include notification of the content indicating the start and end of printing included in steps S105 and S109.

In a case where the notification regarding the execution of printing processing is not required (step S106: NO), the CPU 31 proceeds to processing of step S108. In a case where the notification regarding the execution of printing processing is required (step S106: YES), the CPU 31 individually provides the notification regarding the execution of printing processing to some of a plurality of users participating in the talk room without using the talk room (step S107). Here, some users are, for example, posters who have posted information in step S101. For example, as shown in FIG. 10, the CPU 31 posts information M110 indicating the error content in a talk room dedicated to the user A in which the user A, who is a poster, and a chatbot participate on a one-to-one basis. In contrast, for example, the user A posts information M111 indicating an instruction to resolve the error in the talk room dedicated to the user A. As a result, printing is resumed, and the CPU 31 posts information M112 indicating that printing is resumed. The error cannot be necessarily resolved by the user A posting information. For example, in the case of a paper jam, it is necessary for the user A to remove the jammed paper in the image forming apparatus 40. In this manner, in a case where processing or an operation on the image forming apparatus 40 is required, the user A completes the required processing or the like, so that printing is resumed even in a case where the information M111 is not posted.

The CPU 31 determines whether or not the printing processing has been completed (step S108). In a case where the printing processing is not completed (step S108: NO), the CPU 31 returns to the processing of step S106. In a case where the printing processing is completed (step S108: YES), the CPU 31 posts information M105 indicating that the printing has ended to the talk room (step S109).

As described above, in the first exemplary embodiment, notification of information indicating the execution start and execution completion of the printing processing is provided to the group talk room in which a plurality of users participate, and notification of information indicating the content other than the execution start and execution completion of the printing processing is provided to the private talk room. That is, the predetermined conditions for providing notification to only some users are that the content of the notification is the content other than the execution start and execution completion of the printing processing.

Second Exemplary Embodiment

In a second exemplary embodiment, predetermined conditions for providing notification to only some users are different from those in the first exemplary embodiment. In the second exemplary embodiment, the predetermined conditions are set by a combination of the content of notification and a user who is a target of the notification. This will be described in detail below.

Figure 11:
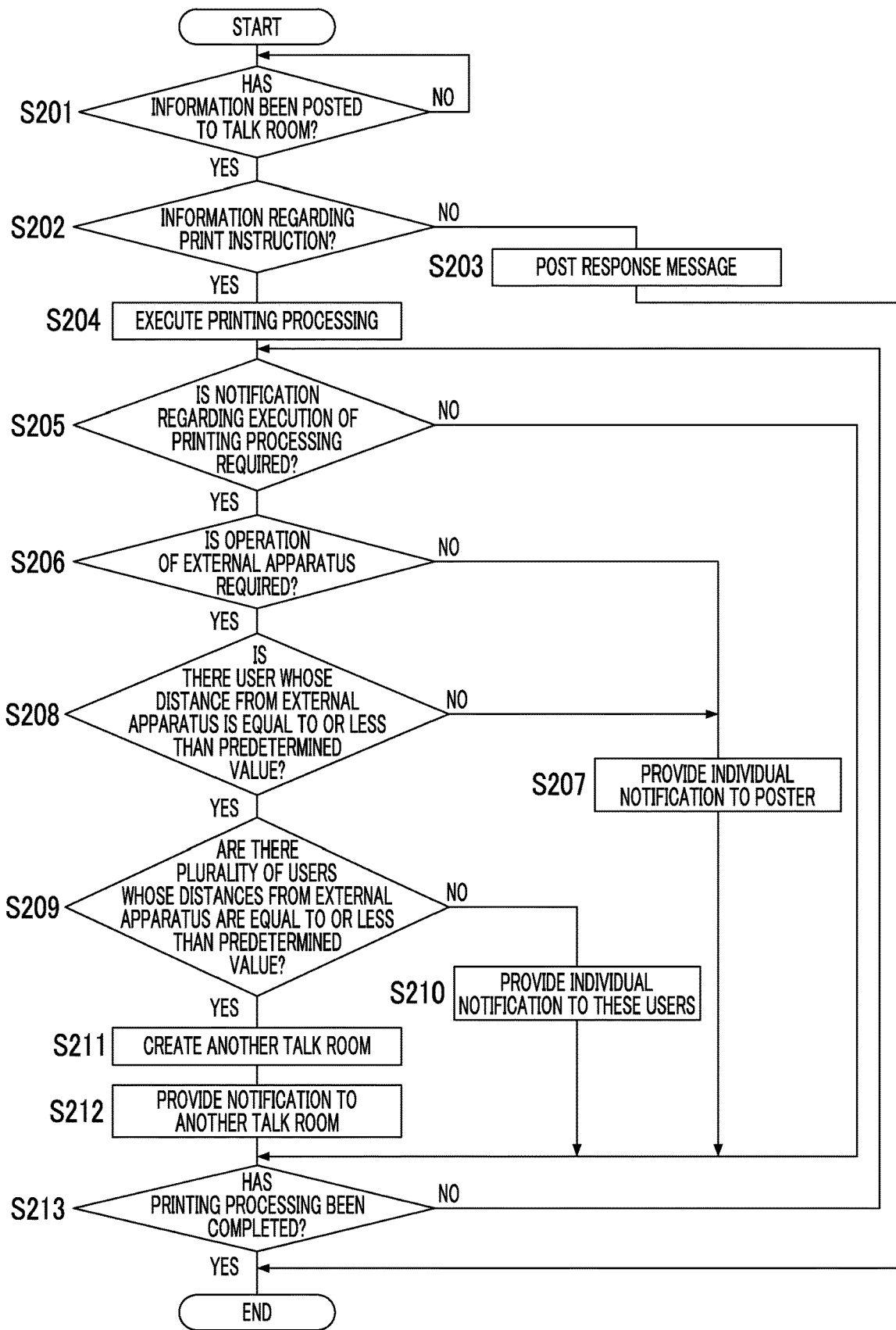
FIG. 11 is a flowchart showing the flow of control processing by a chatbot server according to a second exemplary embodiment.
Figure 12:
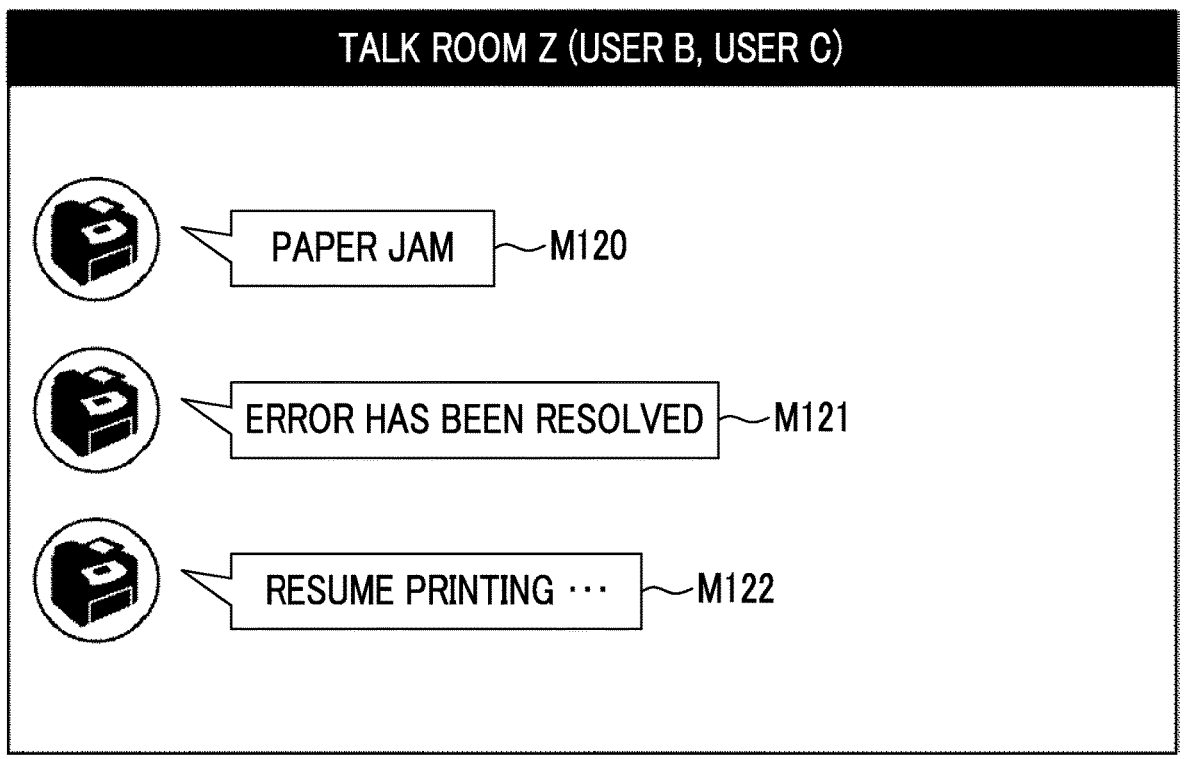
FIG. 12 is a diagram showing how posting is executed in a talk room.

FIG. 11 is a flowchart showing the flow of control processing by a chatbot server according to the second exemplary embodiment. The control processing is performed by the CPU 31 that reads a control program from the ROM 32 or the storage 34 and loads the control program to the RAM 33 to execute the control program. FIG. 12 is a diagram showing how posting is executed in a talk room.

Since steps S201 to S204 in FIG. 11 are the same as steps S101 to S104 in FIG. 8, the description thereof will be omitted.

The CPU 31 determines whether or not notification regarding the execution of printing processing is required (step S205). The notification regarding the execution of printing processing is, for example, a notification regarding an error occurring until the printing processing is completed. The error is, for example, paper out or paper jam. The case where such an error occurs is a case where notification regarding the execution of printing processing is required.

In a case where the notification regarding the execution of printing processing is not required (step S205: NO), the CPU 31 proceeds to processing of step S213. In a case where the notification regarding the execution of printing processing is required (step S205: YES), the CPU 31 determines whether or not the content of the notification is the content indicating that the operation of the image forming apparatus 40 as an external apparatus is required (step S206). The content indicating that the operation of the external apparatus is required is, for example, the content of a request for elimination of paper jam or the content of a request for paper replenishment due to paper out in the image forming apparatus 40. In a case where paper jam or paper out occurs, it is necessary to provide notification of information indicating that the operation of the external apparatus is required. Conversely, the notification regarding the execution of printing processing that does not require the operation of the external apparatus includes notification of the content regarding processing to be executed before processing in the external apparatus. Examples of the processing to be executed before processing in the external apparatus include correction of a print instruction that cannot be realized in the image forming apparatus 40 and re-input of a damaged print job.

In a case where the content of the notification is not the content indicating that the operation of the external apparatus is required (step S206: NO), the CPU 31 individually provides the notification regarding the execution of printing processing to some of a plurality of users participating in the talk room without using the talk room (step S207). Here, some users are posters who have posted information in step S201. For example, as shown in FIG. 10, the CPU 31 posts the information M110 indicating the error content in a talk room dedicated to the user A in which the user A, who is a poster, and a chatbot participate on a one-to-one basis.

In a case where the content of the notification is the content indicating that the operation of the external apparatus is required (step S206: YES), the CPU 31 determines whether or not there is a user whose distance from the image forming apparatus 40 is equal to or less than a predetermined value (step S208). Here, in order to determine a user whose distance from the image forming apparatus 40 is equal to or less than a predetermined value, location information indicating the location of the user and location information indicating the location of the image forming apparatus 40 are required. The location information can be registered in advance in the chatbot server 30 as an attribute of the user and an attribute of the image forming apparatus 40, for example. Alternatively, since the location of the image forming apparatus 40 is usually fixed, only the location of the image forming apparatus 40 may be registered in advance, and the location information of the user may be acquired from the user terminal 10 each time a print instruction is given. In this case, the user terminal 10 checks the location of the user using, for example, a GPS antenna, and transmits the location information to the chatbot server 30. Alternatively, the locations of the user and the image forming apparatus 40 may be estimated based on attribute data indicating to which the user and the image forming apparatus 40 belong. For example, in a case where the user A has an attribute that the user A belongs to a certain company or a certain department of a company, the place of the company or the department of the company can be estimated as the location of the user. The above-described predetermined value can be set to any value. For example, the predetermined value is set as a value of 50 m or less.

In a case where there is no user whose distance from the image forming apparatus 40 is equal to or less than the predetermined value (step S208: NO), the CPU 31 proceeds to processing of step S207.

In a case where there is a user whose distance from the image forming apparatus 40 is equal to or less than the predetermined value (step S208: YES), the CPU 31 determines whether or not a plurality of users whose distances from the image forming apparatus 40 are equal to or less than the predetermined value are present (step S209).

In a case where a plurality of users whose distances from the image forming apparatus 40 are equal to or less than the predetermined value are not present, that is, in a case where there is only one user whose distance from the image forming apparatus 40 is equal to or less than the predetermined value (step S209: NO), the CPU 31 individually provides notification regarding the execution of printing processing to the one user without using the talk room (step S210).

In a case where a plurality of users whose distances from the image forming apparatus 40 are equal to or less than the predetermined value are present (step S209: YES), the CPU 31 newly creates another group talk room for the plurality of users (step S211). As described above, another talk room is dynamically generated due to the posting of information for giving an instruction to execute printing processing. Then, the CPU 31 provides notification to the plurality of users by posting the notification regarding the execution of printing processing in the created group talk room (step S212). For example, as shown in FIG. 12, the CPU 31 posts information M120 indicating the error content in a group talk room in which the users B and C satisfying the conditions in step S208 passively participate. In a case where an error is resolved, information M121 indicating that the error has been resolved and information M122 indicating that specific processing is resumed are posted to the group talk room. The information M120 to M122 is not posted to the talk room to which the information regarding the print instruction has been originally posted.

The CPU 31 determines whether or not the printing processing has been completed (step S213). In a case where the printing processing is not completed (step S213: NO), the CPU 31 returns to the processing of step S205. In a case where the printing processing is completed (step S213: YES), the CPU 31 ends the control processing.

As described above, in the second exemplary embodiment, in a case where the content of the notification regarding the execution of printing processing is the content regarding processing to be executed before processing in the external apparatus, the poster is individually notified of the content. That is, the predetermined conditions for providing notification to only some users are that the content of the notification is the content regarding processing to be executed before processing in the external apparatus and the user who is a target of the notification is a user who posts information for giving an instruction to execute printing processing.

In the second exemplary embodiment, in a case where the content of the notification regarding the execution of printing processing is the content indicating that the operation of the external apparatus is required and there is a user whose distance from the external apparatus is equal to or less than the predetermined value, the notification is provided to the user. That is, the predetermined conditions for providing notification to only some users are that the content of the notification is the content indicating that the operation of the external apparatus is required and the user who is a target of the notification is a user whose distance from the external apparatus is equal to or less than the predetermined value. The predetermined conditions are not limited to the user whose distance from the external apparatus is equal to or less than the predetermined value. The predetermined conditions may be any conditions as long as a user satisfies a predetermined relationship with an external apparatus. For example, the user who satisfies a predetermined relationship with an external apparatus may be a user associated with the external apparatus. In this case, with reference to a table such as that shown in FIG. 6, only the user associated with an image forming apparatus instructed to print in the group talk room is notified of the association between the external apparatus and the user.

Third Exemplary Embodiment

In a third exemplary embodiment, re-notification is performed in a case where an error is not resolved after providing notification to some of a plurality of users participating in a group talk room. Re-notification shown in the third exemplary embodiment can also be applied to the first and second exemplary embodiments.

Figure 13:
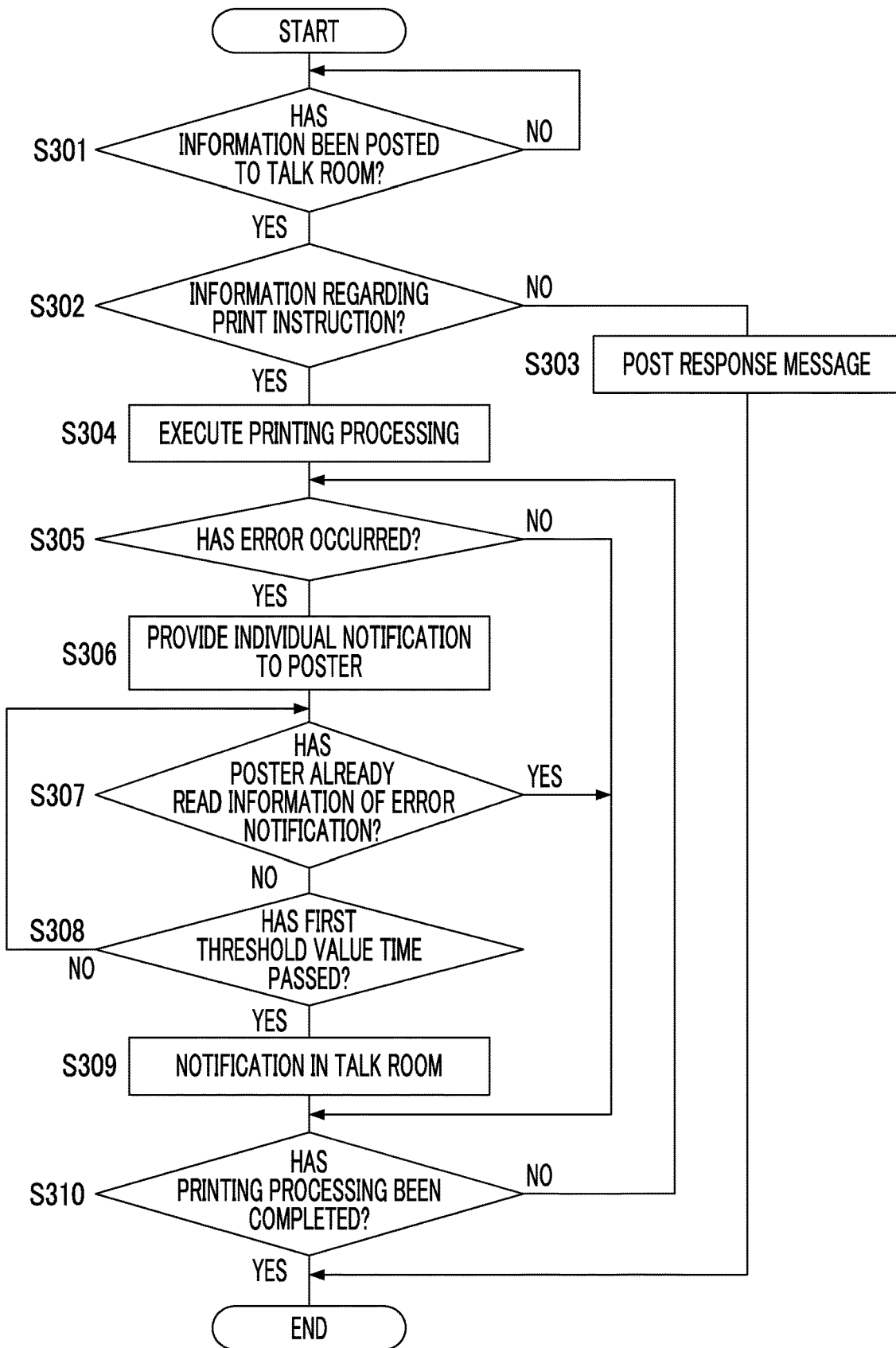
FIG. 13 is a flowchart showing the flow of control processing by a chatbot server according to a third exemplary embodiment.

FIG. 13 is a flowchart showing the flow of control processing by a chatbot server according to the third exemplary embodiment. The control processing is performed by the CPU 31 that reads a control program from the ROM 32 or the storage 34 and loads the control program to the RAM 33 to execute the control program.

Since steps S301 to S304 in FIG. 13 are the same as steps S101 to S104 in FIG. 8, the description thereof will be omitted.

The CPU 31 determines whether or not an error has occurred in printing processing (step S305). In a case where no error occurs (step S305: NO), the CPU 31 proceeds to processing of step S310.

In a case where an error occurs (step S305: YES), the CPU 31 notifies a poster who has posted a print instruction that the error has occurred (step S306). Here, individual notification is provided by posting information to the private talk room of the poster.

The CPU 31 determines whether or not the information has been checked by the poster even though a first threshold value time has passed from the individual notification, that is, whether or not the information of error notification posted to the private talk room has already been read by the poster (step S307). The information switches to a read state by being displayed on a display unit, such as a display provided in the user terminal, by the poster.

In a case where the information of error notification has already been read by the poster (step S307: YES), the CPU 31 proceeds to processing of step S310. In a case where the information of error notification has not already been read by the poster (step S307: NO), the CPU 31 determines whether or not the first threshold value time has passed since the information of error notification is posted to the private talk room (step S308). The first threshold value time is a time set randomly. For example, the first threshold value time is set in consideration of the time required for the user to resolve the error and the time allowed even in a case where the occurrence of error is neglected in the information processing apparatus, such as the image forming apparatus 40.

In a case where the first threshold value time has not passed (step S308: NO), the CPU 31 returns to the processing of step S307. On the other hand, in a case where the first threshold value time has passed (step S308: YES), the CPU 31 posts the information of error notification to the group talk room to which information regarding the print instruction is posted first (step S309). In this manner, users other than the poster can check the occurrence of error in the image forming apparatus 40.

The CPU 31 determines whether or not the printing processing has been completed (step S310). In a case where the printing processing is not completed (step S310: NO), the CPU 31 returns to the processing of step S305. In a case where the printing processing is completed (step S310: YES), the CPU 31 ends the control processing.

Instead of the steps S307 and S308 described above, it may be determined whether or not the error has been resolved and whether or not the second threshold value time has passed. Whether or not the error has been resolved can be checked by referring to the error detection state in the image forming apparatus 40. The second threshold value time is a time set randomly. For example, the second threshold value time is set in consideration of the time allowed even in a case where the occurrence of error is neglected in the information processing apparatus, such as the image forming apparatus 40. The second threshold value time is set as a time longer than the first threshold value time.

Fourth Exemplary Embodiment

In a fourth exemplary embodiment, it is assumed that, in principle, a target who receives error notification, among a plurality of users participating in a group talk room, is a poster who has posted an instruction to execute specific processing.

Figure 14:
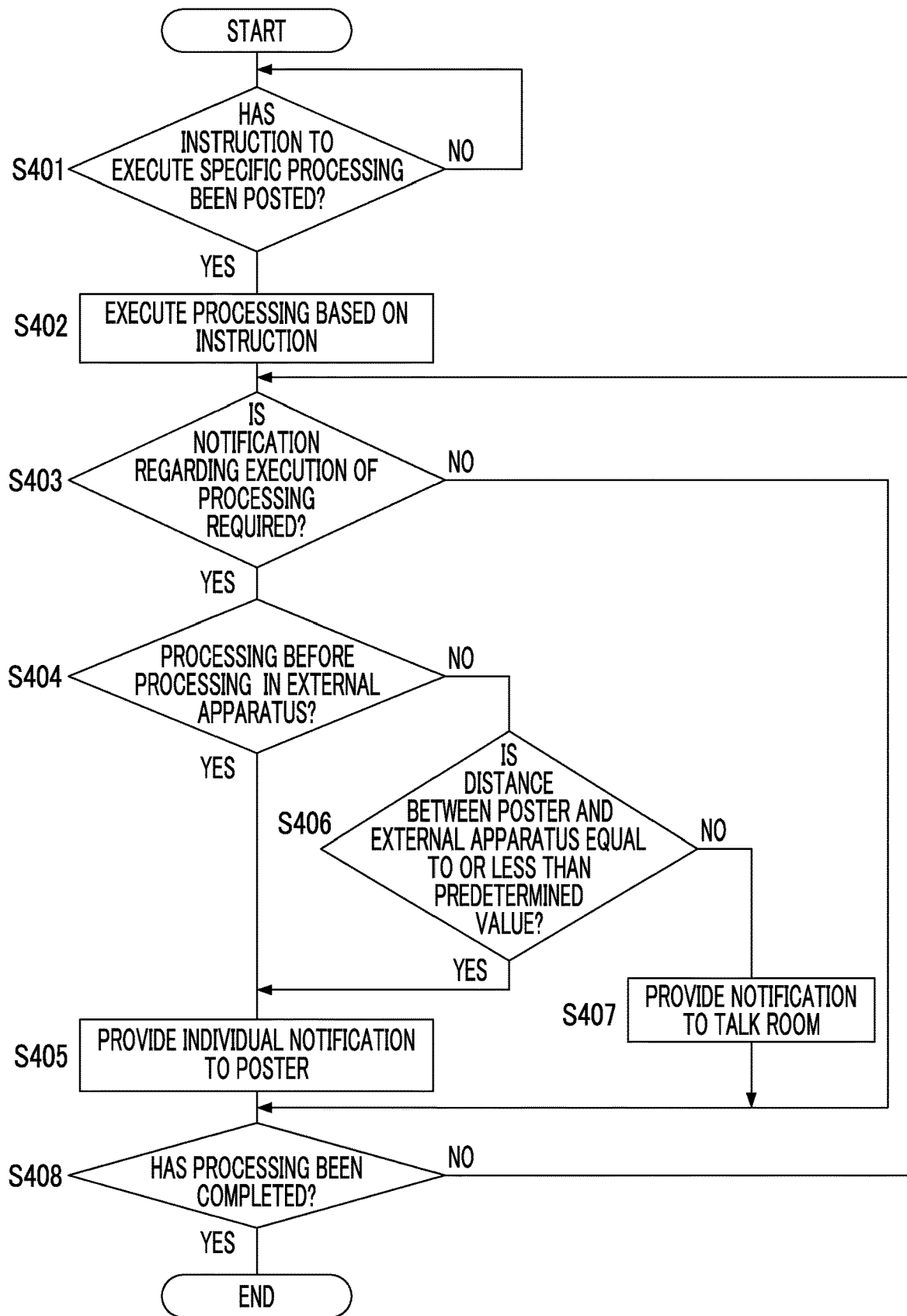
FIG. 14 is a flowchart showing the flow of control processing by a chatbot server according to a fourth exemplary embodiment.

FIG. 14 is a flowchart showing the flow of control processing by a chatbot server according to the fourth exemplary embodiment. The control processing is performed by the CPU 31 that reads a control program from the ROM 32 or the storage 34 and loads the control program to the RAM 33 to execute the control program.

The CPU 31 determines whether or not information for giving an instruction to execute specific processing has been posted in a group talk room in which a plurality of users participate (step S401). In a case where no information for giving an instruction to execute specific processing is not posted (step S401: NO), the CPU 31 waits until the information is posted.

In a case where the information for giving an instruction to execute specific processing is posted (step S401: YES), the CPU 31 controls the information processing apparatus 40 to execute processing based on the instruction (step S402).

The CPU 31 determines whether or not notification regarding the execution of processing is required, that is, whether or not the notification of error in the information processing apparatus 40 is required (step S403). In a case where an error occurs in the information processing apparatus 40, notification of the error is required. In a case where the notification regarding the execution of processing is not required (step S403: NO), the CPU 31 proceeds to processing of step S408.

In a case where the notification regarding the execution of processing is required (step S403: YES), the CPU 31 determines whether or not the content of the notification is relevant to processing to be executed before the processing executed in the information processing apparatus 40 (step S404). Examples of the processing to be executed before processing in the external apparatus include correction of an instruction that cannot be realized in the information processing apparatus 40 and re-input of a damaged instruction job.

In a case where the content of the notification is relevant to processing to be executed before the processing in the external apparatus (step S404: YES), the CPU 31 individually notifies the poster of the error by posting information of the error notification to the private talk room of the poster (step S405).

In a case where the content of the notification is not relevant to processing to be executed before the processing in the external apparatus (step S404: NO), the CPU 31 determines whether or not the distance between the poster and the external apparatus is equal to or less than a predetermined value (step S406). The distance between the poster and the external apparatus can be specified by the method described in step S208 of FIG. 11.

In a case where the distance between the poster and the external apparatus is equal to or less than the predetermined value (step S406: YES), in principle, the CPU 31 individually notifies the poster of the error by posting information of the error notification to the private talk room of the poster (step S405). In a case where the distance between the poster and the external apparatus is not equal to or less than the predetermined value (step S406: NO), exceptionally, the CPU 31 individually notifies all the participants of the group talk room of the error by posting information of the error notification to the group talk room (step S407).

The CPU 31 determines whether or not the execution of the specific processing has been completed (step S408). In a case where the information indicates that the execution of the specific processing is not completed (step S408: NO), the CPU 31 returns to the processing of step S403. In a case where the execution of the specific processing is completed (step S408: YES), the CPU 31 ends the control processing.

In step S404 of the fourth exemplary embodiment, instead of determining whether or not the content of the notification regarding the execution of the processing is relevant to processing to be executed before the processing in the external apparatus, it may be determined whether or not the content of the notification regarding the execution of the processing is relevant to scanning processing for the image forming apparatus 40. In a case where the content of the notification regarding the execution of the processing is relevant to scanning processing (step S404: YES), the poster is individually notified of the error (step S405). The scanning processing is based on the assumption that the user approaches the image forming apparatus 40 to set the paper. Therefore, in the case of notification regarding the execution of scanning processing, it is efficient to provide the notification to the poster.

The above-described processing can also be realized by a dedicated hardware circuit. In this case, the above-described processing may be executed by one piece of hardware or may be executed by a plurality of pieces of hardware.

A program causing the chatbot server 30 to operate may be provided by a computer readable recording medium, such as a universal serial bus (USB) memory, a flexible disk, and a compact disc read only memory (CD-ROM), or may be provided on-line through a network, such as the Internet. In this case, the program recorded on a computer readable recording medium is usually transmitted to a memory, a storage, or the like and stored. For example, this program may be provided as stand-alone application software, or may be built into the software of each apparatus as one function of the chatbot server 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device, comprising:
a processor that performs control to execute specific processing based on information posted by a user in a talk room in which each of a plurality of participating users is able to post and view information,
wherein the processor provides notification regarding execution of the specific processing to only some users of the plurality of participating users according to predetermined conditions.

2. The control device according to claim 1,
wherein the predetermined conditions are that a content of the notification is a content other than a content indicating start of execution or completion of execution of the specific processing, and
the processor posts the notification to the talk room in a case where the content of the notification is the content indicating start of execution or completion of execution of the specific processing.

3. The control device according to claim 2,
wherein, in a case where there are a plurality of users of notification destinations of the notification regarding execution of the specific processing, the processor posts the notification regarding execution of the specific processing to another talk room which only the plurality of users of the notification destinations participate.

4. The control device according to claim 1,
wherein the predetermined conditions are set by a combination of a content of the notification and the some users to whom the notification is to be provided.

5. The control device according to claim 4,
wherein the specific processing is processing executed by an external apparatus, and
the predetermined conditions are that the content of the notification is a content indicating that an operation of the external apparatus is required and the some users are users satisfying a predetermined relationship with the external apparatus among the of c a users participating in the talk room.

6. The control device according to claim 5,
wherein the predetermined relationship is that a distance from the external apparatus is equal to or less than a predetermined value, and
the some users are users whose distances from the external apparatus are equal to or less than the predetermined value among the plurality of participating users.

7. The control device according to claim 6,
wherein, in a case where there are a plurality of users of notification destinations of the notification regarding execution of the specific processing, the processor posts the notification regarding execution of the specific processing to another talk room in which only the plurality of users of the notification destinations participate.

8. The control device according to claim 5,
wherein the predetermined relationship is that association with the external apparatus is registered in advance, and
the some users are users associated with the external apparatus among the plurality of participating users.

9. The control device according to claim 5,
wherein the predetermined conditions are that the content of the notification is a content regarding processing to be executed before processing in the external apparatus and the some users are users who post information for giving an instruction to execute the specific processing among the plurality of participating users.

10. The control device according to claim 5,
wherein, in a case where there are a plurality of users of notification destinations of the notification regarding execution of the specific processing, the processor posts the notification regarding execution of the specific processing to another talk room in which only the plurality of users of the notification destinations participate.

11. The control device according to claim 4,
wherein, in a case where there are a plurality of users of notification destinations of the notification regarding execution of the specific processing, the processor posts the notification regarding execution of the specific processing to another talk room in which only the plurality of users of the notification destinations participate.

12. The control device according to claim 1,
wherein, in a case where there are a plurality of users of notification destinations of the notification regarding execution of the specific processing, the processor posts the notification regarding execution of the specific processing to another talk room in which only the plurality of users of the notification destinations participate.

13. The control device according to claim 12, wherein another talk room is dynamically generated due to posting of information for giving an instruction to execute the specific processing.

14. The control device according to claim 1, wherein the some users are users who post information for giving an instruction to execute the specific processing among the plurality of participating users.

15. The control device according to claim 14, wherein the specific processing is processing executed by an external apparatus, and
the processor provides notification regarding execution of the specific processing to only a user who posts information in a case where a distance from the external apparatus is equal to or less than a predetermined value, and posts notification regarding execution of the specific processing to the talk room in a case where the distance from the external apparatus is greater than the predetermined value.

16. The control device according to claim 14, wherein the specific processing is scanning processing for reading an image from a document, and
the predetermined conditions are that a content of the notification is relevant to the scanning processing.

17. The control device according to claim 1, wherein the processor further provides the notification to users other than the some users among the plurality of users in a case where the notification is not checked by the some users even though a first threshold value time has passed.

18. The control device according to claim 17, wherein the processor further provides the notification to the users other than the some users in a case where processing corresponding to the notification is not performed by the some users even though a second threshold value time has passed.

19. The control device according to claim 18, wherein the second threshold value time is set to a e longer than the first threshold value time.

20. A non-transitory computer readable medium storing a control program causing a computer to function as:
the control device according to claim 1.

* * * * *